Patented Mar. 29, 1949

2,465,750

UNITED STATES PATENT OFFICE 2,465,750

COMPOSITION FOR PREPARING ALUMINUM AND THE LIKE FOR WELDING

Arthur A. Reid, Westfield, N. J., assignor to Reid Engineering Company, a corporation of New Jersey No Drawing. Application May 23, 1944, Serial No. 536,974

2 Claims. (Cl. 148—6.15)

My invention relates to a composition intended primarily for the preparation of surfaces of parts made of aluminum or its alloys, such as "Alclad" and "Bear brand," for electric welding, and it is an object of the same to provide means whereby such surfaces may be cleaned and deoxidized more thoroughly and prepared for welding more effectively than has been possible heretofore, as by the use of various cleaning preparations and methods or processes, the treatment herein described resulting in complete removal of paints, oils, oxides and other foreign substances.

Another object of the invention is to provide composition for treatment of surfaces of aluminum and the like in the use of which there is deposited on the said surfaces in the cleaning operation (or, perhaps more accurately, directly after cleaning has been completed) a protective coating that is effective to prevent oxidation for a substantial period, yet which will crumble and disappear upon application of a welding current.

Another object is to provide a composition in the use of which assembled units can be so treated as to prepare their contacting surfaces for effective electric welding without taking the units apart, which has never heretofore been commercially practicable.

Another object is to provide a surface cleaner that operates at room temperature, and without emission of deleterious or dangerous fumes or gases.

Another object of my invention is to provide a liquid surface cleaner that has longer life than any other known to me, in that the solution does not lose strength, but is subject to loss of volume solely due to "drag-out," i. e., the loss occurring by immersion and removal of articles, which carry out with them the adherent liquid.

Another object of the invention is to provide a composition for cleaning the surfaces of sheets, etc., of aluminum and aluminum alloys after the use of which that the union after welding is stronger and the grain structure in the weld is of greater refinement than has heretofore been known.

The composition which is the subject matter of my invention is used as a liquid, and ordinarily is used at room temperature, without either raising or lowering its temperature, except that when the room temperature rises to about 100° Fahr. it becomes necessary to reduce the temperature of the solution because of the tendency of the solution to decompose at higher temperatures than 100° Fahr.

The composition is used as a single tank solution, and the articles to be cleansed may be immersed in the solution either as individual articles or as assembled or partly assembled devices, since the nature of the solution is such that the cleansing operation proceeds thoroughly into all joints and between all contacting surfaces, so that parts which have been assembled ready for welding, as for example an airplane rib and its stays, struts, or lattice bars, may be immersed in my solution, rinsed, dried and then immediately welded, instead of the usual time-consuming process of immersing each separate part individually in a tank or of stringing a series of parts on a support that can be so immersed, then subsequently assembling them, and then welding. In connection with the processes now in use there is danger of the parts collecting dirt, oil or grease, etc., after they have been cleaned, and there is also danger of oxidation, which occurs very quickly indeed upon exposure of the surface of any part made of aluminum and such alloys of aluminum as are used in construction work.

Surface resistances of 39 to 60 microhms are usual in aluminum articles and in articles and parts made of "Alclad" and the like, after they have been cleaned by the methods now in use, whereas with my solution the surface resistance is much lower, being commonly as low as 10 microhms and it being entirely feasible to bring the surface resistance down almost to zero, e. g., as low as one or two microhms.

Preferably an article or part is immersed for about twenty minutes in the solution, then washed in cold water for five minutes, and then dried, the grease that is removed in the cleaning process rising to the top of the tank and being removed in any suitable manner, but the drying step may be omitted.

The "copper pick-up" in spot welding of aluminum and aluminum alloys treated in accordance with my invention is very low, it being found that approximately 1500 A N (Army-Navy Aeronautical Specifications) acceptable welds are possible prior to the necessity for redressing the electrodes. No difficulty is found in carrying on subsequent operations, such as anodizing and painting, and the quality of the anodized surfaces is particularly satisfactory.

While the composition and method herein disclosed are especially desirable for use in preparing objects for spot welding, they are also applicable to line or seam welding and flash welding or any analogous process.

A preferred form of my composition consists of the following:

| | Per cent by volume |
|---|---|
| Orthophosphoric acid ($H_3PO_4$) 75–80% U. S. P. | 33 |
| Nitric acid ($HNO_3$) 38–40% U. S. P. | 33 |
| Ammonia ($NH_4OH$) of 28% strength | 32 |
| Wetting agent | 1 |

In the above formula the preferred wetting agent is a compound known commercially as "Aerosol," this being a sodium salt of a sulfonated ester of di-carboxylic acid, and being more fully identified in Patent No. 2,028,091 to Jaeger. The ammonia may be in liquid solution, or salts of ammonia may be used.

The composition may be prepared by mixing ammonia with nitric acid to produce ammonium nitrate and water, and thereafter adding phosphoric acid to the resultant liquid to produce ammonium phosphate and nitric acid in accordance with the following chemical formulae:

$$NH_4OH + HNO_3 = NH_4NO_3 + H_2O$$
$$NH_4NO_3 + H_3PO_4 = NH_4H_2PO_4 + HNO_3$$

and then adding the wetting agent.

In the use of the solution a suitable quantity is placed in a tank made of glass or suitable non-ferrous metal, preferably enough being used to submerge whatever objects are to be treated. In the case of assembled parts for instance of an airplane wing structure, preferably a basket will be used which is large enough to contain the assembly to be treated, or to hold a large number of parts or assemblies depending on the needs of the plant, and another tank near by may be used for rinsing, the basket being moved from one tank to the other after a suitable time.

Experiments have shown that all dirt, grease, oil and oxides are removed from objects submerged in the bath within about fifteen minutes, and that within the next five minutes a thin layer of ammonium phosphate will build up on the same. This layer will protect the aluminum or alloy for about ninety-six hours after formation of the coating (whereas without such coating oxidation begins almost the instant that exposure of a clean surface occurs); and when the welding current passes through the parts the layer or coating of ammonium phosphate immediately disintegrates and disappears as a crumbly powder, which does not interfere with the welding.

Other wetting agents may be substituted for the one specifically identified, e. g., Nacconol NR, Tergitol, Penetrol, Duponol and Carbo-wax, and minor changes may also be made in proportions, etc., without departing from the spirit of the invention, obviously also objects made of other non-ferrous metals or alloys as copper, brass and Monel metal may be thus cleansed since the composition is effective for other non-ferrous metals and alloys such as are not injured by the composition. Therefore I do not limit myself to what is herein described, except as indicated by the appended claims.

Having thus fully described my invention, what I claim is:

1. A composition of matter for treatment of surfaces of aluminum and its alloys preparatory to electric welding, said composition consisting essentially of a liquid resulting from the mixing of the following ingredients in approximately the proportions set forth:

| | Per cent by volume |
|---|---|
| Orthophosphoric acid 75–80% U. S. P. | 33 |
| Nitric acid 38–40% U. S. P. | 33 |
| Ammonia ($NH_4OH$ of 28% strength) | 32 |
| Wetting agent | 1 | and said liquid containing a substantial proportion of free nitric acid.

2. A composition for preparing aluminum and aluminum parts for welding comprising a liquid composition consisting of substantially equal parts by volume of each of orthophosphoric acid, nitric acid and ammonia, and also containing a small quantity of a wetting agent; the orthophosphoric being approximately 75–80% U. S. P.; the nitric acid approximately 30–40% U. S. P. and the ammonia $NH_4OH$ of 28% strength.

ARTHUR A. REID.

REFERENCES CITED

The following references are of record in the file of this patent:

UNITED STATES PATENTS

| Number | Name | Date |
|---|---|---|
| 703,096 | Stecker | June 24, 1902 |
| 1,911,726 | Tanner et al. | May 30, 1933 |
| 2,227,945 | Neilson | Jan. 7, 1941 |
| 2,304,299 | Boyle et al. | Dec. 8, 1942 |
| 2,312,855 | Thompson | May 2, 1943 |
| 2,348,698 | Thompson | May 9, 1944 |

FOREIGN PATENTS

| Number | Country | Date |
|---|---|---|
| 174,489 | Great Britain | Feb. 2, 1922 |